(12) United States Patent
Iwata

(10) Patent No.: US 11,755,101 B2
(45) Date of Patent: Sep. 12, 2023

(54) NON-TRANSITORY COMPUTER-READABLE RECORDING MEDIUM AND AGGREGATION METHOD

(71) Applicant: FUJITSU LIMITED, Kawasaki (JP)

(72) Inventor: Satoshi Iwata, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 40 days.

(21) Appl. No.: 17/384,015

(22) Filed: Jul. 23, 2021

(65) Prior Publication Data

US 2022/0179478 A1 Jun. 9, 2022

(30) Foreign Application Priority Data

Dec. 9, 2020 (JP) ................................. 2020-204141

(51) Int. Cl.
*G06F 1/00* (2006.01)
*G06F 1/3296* (2019.01)
*G06F 11/34* (2006.01)

(52) U.S. Cl.
CPC ........ *G06F 1/3296* (2013.01); *G06F 11/3409* (2013.01)

(58) Field of Classification Search
CPC ........................... G06F 1/3296; G06F 11/3409
See application file for complete search history.

(56) References Cited

U.S. PATENT DOCUMENTS

| 6,041,425 | A | * | 3/2000 | Kokunishi | G06F 11/1435 |
| | | | | | 714/37 |
| 2004/0117534 | A1 | * | 6/2004 | Parry | G06F 13/24 |
| | | | | | 710/260 |
| 2011/0153894 | A1 | * | 6/2011 | Lim | G06F 9/4818 |
| | | | | | 710/269 |
| 2012/0066280 | A1 | * | 3/2012 | Tsutsui | H03H 17/028 |
| | | | | | 708/300 |
| 2015/0339167 | A1 | * | 11/2015 | Takeuchi | G06F 9/5033 |
| | | | | | 718/1 |
| 2020/0250004 | A1 | * | 8/2020 | Furuya | G06F 9/5016 |

FOREIGN PATENT DOCUMENTS

| JP | 10063603 A | * | 3/1998 | ............. G06F 13/12 |
| JP | H10-063603 A | | 3/1998 | |
| JP | 2014-222384 A | | 11/2014 | |

* cited by examiner

*Primary Examiner* — Mohammed H Rehman
(74) *Attorney, Agent, or Firm* — Fujitsu Patent Center

(57) ABSTRACT

Provided is a non-transitory computer-readable recording medium storing an aggregation program causing a computer to execute a process, the process including determining, plural times within a first period of time, whether a first function, which puts a processor into a sleep state, is being executed among functions written in a program being executed by the processor, identifying a second function that is performing either input or output processing among the functions when it is determined that the first function is being executed, and aggregating a number of times that the second function is identified within the first period of time.

7 Claims, 10 Drawing Sheets

FIG. 1

| # Overhead | Command | Shared Object | Symbol |
|---|---|---|---|
| # ........ | ........ | ........ | ........ |
| # | | | |
| 31.18% | stress | stress | [.] hogcpu |
| 29.04% | stress | libc-2.27.so | [.] __random_r |
| 27.84% | stress | libc-2.27.so | [.] __random |
| 6.68% | stress | libc-2.27.so | [.] rand |
| 4.46% | stress | stress | [.] _init |

FIG. 2

| # Overhead | Command | Shared Object | Symbol |
|---|---|---|---|
| # ... | ... | ... | ... |
| # | | | |
| 90.61% | swapper | [kernel.kallsyms] | [k] cpuidle_enter_state |
| 2.73% | cat | [kernel.kallsyms] | [k] copy_user_enhanced_fast_string |
| 0.91% | cat | [kernel.kallsyms] | [k] _raw_spin_unlock_irqrestore |
| 0.91% | swapper | [kernel.kallsyms] | [k] poll_idle |
| 0.76% | cat | [kernel.kallsyms] | [k] get_page_from_freelist |

FIG. 3

| # Overhead | Command | Shared Object | Symbol |
|---|---|---|---|
| # ........ | ........ | ........ | ........ |
| # | | | |
| 54.93% | swapper | [kernel.kallsyms] | [k] cpuidle_enter_state |
| 13.19% | stress | libc-2.27.so | [.] __random |
| 12.67% | stress | libc-2.27.so | [.] __random_r |
| 9.28% | stress | stress | [.] hogcpu |
| 3.50% | stress | libc-2.27.so | [.] rand |
| 1.75% | stress | stress | [.] __init |
| 0.82% | cat | [kernel.kallsyms] | [k] copy_user_enhanced_fast_string |
| 0.58% | cat | [kernel.kallsyms] | [k] __add_to_page_cache_locked |

FIG. 6

```
iwata@stratus052:~$ ps aux
USER    PID  %CPU %MEM   VSZ   RSS TTY     STAT START   TIME COMMAND
root      1   0.0  0.0 225224 8964 ?       Ss   Jul13   1:33 /sbin/init
root      2   0.0  0.0      0    0 ?       S    Jul13   0:00 [kthreadd]
root      3   0.0  0.0      0    0 ?       I    Jul13   1:05 [kworker/0:0]
root      4   0.0  0.0      0    0 ?       I<   Jul13   0:00 [kworker/0:0H]
root      7   0.0  0.0      0    0 ?       I<   Jul13   0:00 [mm_percpu_wq]
...
iwata 74092  15.0  0.0   7624  852 pts/0   D    16:50   0:00 cat 1G
```

FIG. 7

```
[fx700user@fx700-01-00 ~]$ gstack $PID
#0  0x0000ffffa995370c in read () from /lib64/libc.so.6
#1  0x0000aaaab7da4908 in safe_read ()
#2  0x0000aaaab7da2458 in main ()
```

FIG. 8

| # Overhead | Command | Shared Object | Symbol |
|---|---|---|---|
| # ......... | | | |
| # | | | |
| 34.93% | cat | XXX | [.] read |
| 20.00% | cat | YYY | [.] yyy |
| 13.19% | stress | libc-2.27.so | [.] __random |
| 12.67% | stress | libc-2.27.so | [.] __random_r |
| 9.28% | stress | stress | [.] hogcpu |
| 3.50% | stress | libc-2.27.so | [.] rand |
| 1.75% | stress | stress | [.] init |
| 0.82% | cat | [kernel.kallsyms] | [k] copy_user_enhanced_fast_string |
| 0.58% | cat | [kernel.kallsyms] | [k] __add_to_page_cache_locked |

NON-TRANSITORY COMPUTER-READABLE RECORDING MEDIUM AND AGGREGATION METHOD

CROSS-REFERENCE TO RELATED APPLICATION

This application is based upon and claims the benefit of priority of the prior Japanese Patent Application No. 2020-204141, filed on Dec. 9, 2020, the entire contents of which are incorporated herein by reference.

FIELD

A certain aspect of embodiments described herein relates to a non-transitory computer-readable recording medium and an aggregation method.

BACKGROUND

Programs for high performance computing (HPC) and web applications call a plurality of functions internally at run time. Among those functions, functions having particularly long execution times prevent the speeding-up of the program. Thus, various profiling methods that achieve the speeding-up of the program by identifying the functions having long execution times have been developed.

However, the existing profiling methods have difficulty in identifying functions that perform input/output processing to/from an external network card, a disk device, and the like by the central processing unit (CPU). Note that the technique related to the present disclosure is also disclosed in Japanese Laid-Open Patent Publication Nos. 2014-222384 and H10-63603.

SUMMARY

According to an aspect of the embodiments, there is provided a non-transitory computer-readable recording medium storing an aggregation program causing a computer to execute a process, the process including: determining, plural times within a first period of time, whether a first function, which puts a processor into a sleep state, is being executed among functions written in a program being executed by the processor; identifying a second function that is performing either input or output processing among the functions when it is determined that the first function is being executed; and aggregating a number of times that the second function is identified within the first period of time.

BRIEF DESCRIPTION OF DRAWINGS

FIG. 1 schematically illustrates an exemplary output of perf.

FIG. 2 illustrates output results of perf when a cat command is executed.

FIG. 3 illustrates output results of perf when a stress command and a cat command are executed.

FIG. 6 schematically illustrates a display example when a second determination unit executes a ps command in the embodiment.

FIG. 7 schematically illustrates a display example when an identification unit executes a gstack command in the embodiment.

FIG. 8 schematically illustrates a display example of a display unit in the embodiment.

DESCRIPTION OF EMBODIMENTS

Figure 4:
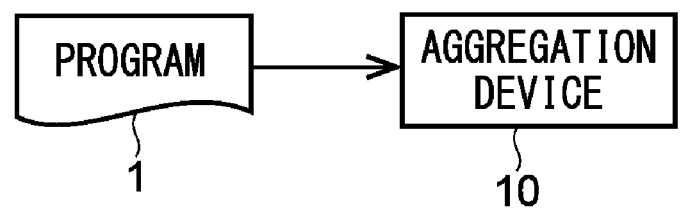
FIG. 4 is a block diagram of an aggregation device in accordance with an embodiment.

Prior to the description of an embodiment, what the inventor studied will be described.

To speed up a program, it is effective to identify a function that is taking a long time to process during the execution of the program. Perf and a flame graph, which visualizes the output of perf, are known as such profiling methods of identifying the function. Perf is a kind of performance analysis tool of Linux (registered trademark), and calculates the ratio of the processing time of the function to the measuring time.

FIG. 1 schematically illustrates an exemplary output of perf with respect to a certain program.

In FIG. 1, "Overhead" indicates the ratio of the processing time of the function to the measuring time. Additionally, "Command" indicates a command that calls a function. "Shared Object" is a shared library used by the corresponding command. "Symbol" is a symbol indicating the name of the function called by the corresponding command.

In the example illustrated in FIG. 1, when the command "stress" is executed, "Overhead" of the function "hogcpu" is 31.18%, and this function takes the largest time to process. In addition, the functions "_random_r" and "_random" have more than 20% of "Overhead", indicating that focusing on these functions is effective in speeding up the program.

Perf is a tool for identifying the functions on a sampling basis. For example, perf interrupts the CPU periodically, and identifies the function executed by the CPU at the time of the interruption by identifying the return instruction pointer (RIP) at the time of the interruption. Perf repeats this process to identify the ratio of the processing time of each function to the measuring time. The method of identifying functions on a sampling basis has advantages that it requires less overhead for processing than the method of monitoring all function calls.

When a computing device executes a program, not only does the CPU execute the function, but also external devices such as a storage device and a network card perform input/output processing. After issuing, to the operating system (OS), a write request and a read request to an external device, the function performing input/output processing enters an input/output waiting state, which is a state of waiting for input and output to be completed, and surrenders the CPU to another process. In the input/output waiting state, the function different from the function that performs input/output processing is being executed on the CPU. Therefore, it is impossible to identify the function that performs input/output processing with perf.

FIG. 2 and FIG. 3 are schematic views for describing the above problem.

The example of FIG. 2 illustrates output results of perf when a cat command was executed. The cat command is a command for displaying the contents of a file, and is a command that involves input and output to and from the storage device where the file is stored.

However, in the example of FIG. 2, it appears that most of the processing time is spent on a cpuidle_enter_state function called by the command "swapper". The reason is as follows. Because the cat command entered the state of waiting for the input and output of the storage device, there was no longer a process to run on the CPU, and the OS started swapper that is executed when there is no process to run on the CPU.

The example of FIG. 3 illustrates output result of perf when a process that loads the CPU was executed with a stress command, and then, the cat command was executed for the same amount of time.

Even though the cat command was executed for the same amount of time as the stress command, a swapper command occupies most of the processing in the example in FIG. 3. This is because the cat command entered the state of waiting for input and output of the storage device and the OS started swapper as in the example of FIG. 2.

However, in the examples of FIG. 2 and FIG. 3, the cat command, which performs input/output processing, seems to be little executed, which misleads program developers.

Instead of the sampling-based method such as perf, a method such as strace can be used to measure the processing time of the function. Strace is a command for measuring the processing time by obtaining the timestamps at the start and end of the execution of the function and calculating the difference between the obtained timestamps. However, strace measures the processing time every time the function is called, and thus, has a disadvantage, a large processing overhead.

Embodiment

FIG. 4 is a block diagram of an aggregation device in accordance with an embodiment.

An aggregation device 10 is a computing machine such as a personal computer (PC) or a server, and receives input of a program 1 to be examined. In the present embodiment, the aggregation device 10 aggregates the functions that perform input/output processing that takes a long processing time, among the functions written in the program 1 in the following manner. The OS of the aggregation device 10 is not particularly limited, but here, a case where the OS is Linux (registered trademark) will be described as an example.

Figure 5:
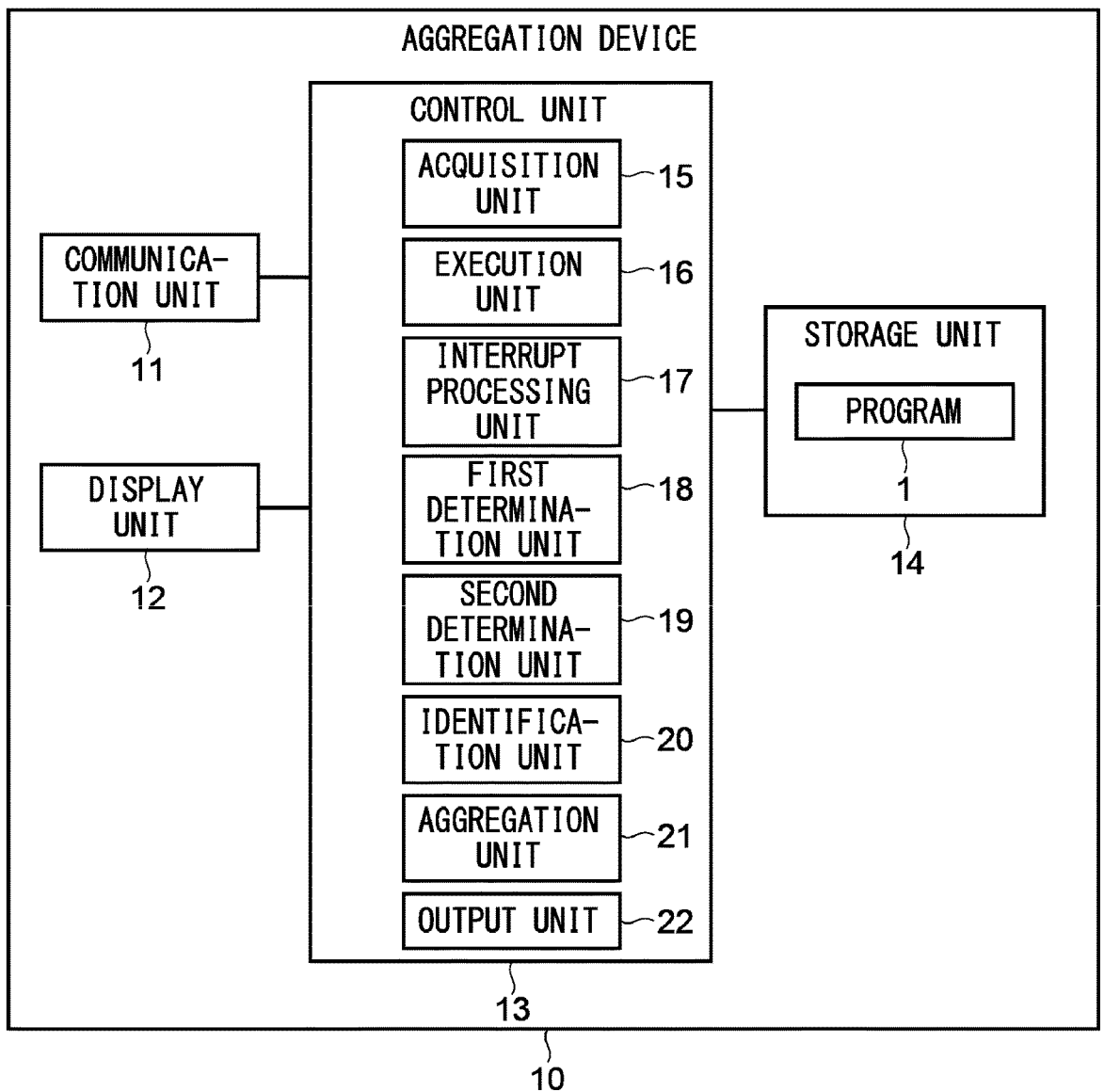
FIG. 5 is a functional block diagram of the aggregation device in accordance with the embodiment.

FIG. 5 is a functional block diagram of the aggregation device 10.

As illustrated in FIG. 5, the aggregation device 10 includes a communication unit 11, a display unit 12, a control unit 13, and a storage unit 14. The communication unit 11 is an interface that connects the aggregation device 10 to a local area network (LAN), the Internet, and the like. The display unit 12 is a display device such as a liquid crystal display that displays aggregation results. The storage unit 14 stores the program 1 to be examined.

The control unit 13 is a processing unit that controls each component of the aggregation device 10, and includes an acquisition unit 15, an execution unit 16, an interrupt processing unit 17, a first determination unit 18, a second determination unit 19, an identification unit 20, an aggregation unit 21, and an output unit 22.

The acquisition unit 15 acquires the program 1 through the communication unit 11, and stores the program 1 in the storage unit 14.

The execution unit 16 is a processing unit that causes a processor to execute the program 1 stored in the storage unit 14.

The interrupt processing unit 17 is a processing unit that interrupts the processor periodically by executing perf when the processor is executing the program 1. The first determination unit 18 is a processing unit that determines whether the processor is executing a function that puts the processor into a sleep state among the functions written in the program 1 at the time when the interrupt processing unit 17 executes the interrupt.

For example, the first determination unit 18 obtains the RIP output by perf, and determines whether a function that puts the processor into a sleep state is being executed based on the obtained RIP. The function that puts the processor into a sleep state is an example of a first function, and is, for example, a cpuidle_enter_state function. When the processor executes the cpuidle_enter_state function, the processor enters a sleep state where the processor waits for wake-up without executing any process.

The method of determining whether the function that puts the processor into a sleep state is being executed is not particularly limited. For example, a table indicating the correspondence relationship between the function that puts the processor into a sleep state and its RIP may be stored in the storage unit 14 in advance, and the first determination unit 18 may perform the determination by referring to the table.

The second determination unit 19 determines whether the processor is executing a process waiting for input and output when the first determination unit 18 determines that the function that puts the processor into a sleep state is being executed. As an example, the second determination unit 19 executes a ps command to determine whether the process waiting for input and output is being executed. The second determination unit 19 obtains a process ID that uniquely identifies the process waiting for input and output based on the execution result of the ps command.

FIG. 6 schematically illustrates a display example when the second determination unit 19 executes the ps command.

As illustrated in FIG. 6, the ps command displays "PID", "STAT", and "COMMAND" in association with each other.

Among them, "PID" is a process ID. "STAT" is an identifier indicating the status of the process that is being executed. For example, "S" indicates an interruptible sleep state. "I" indicates that the process is being generated. "D" indicates an uninterruptible sleep state. Note that "s" indicates a session leader, and "<" indicates a process with higher priority. "COMMAND" is a command that is executing the process.

The second determination unit 19 determines that the process of which "STAT" is "D" is the process waiting for input and output, and obtains "PID" of the process.

Referring to FIG. 5 again, the description will be continued.

The identification unit 20 is a processing unit that identifies a function that is performing input/output processing when the second determination unit 19 determines that the processor is executing the process waiting for input and output. For example, the identification unit 20 executes a gstack command to identify the function that is performing input/output processing.

FIG. 7 schematically illustrates a display example when the identification unit 20 executes the gstack command.

In the example of FIG. 7, the identification unit 20 passes the process ID of the process waiting for input and output obtained by the second determination unit 19 to the argument "$PID" of the gstack command. This causes the gstack command to return the function "read( )", which is being executed by the process identified by the process ID, and its execution address "0x0000ffffa995370c". Then, the identification unit 20 identifies the function "read( )" as the function that is performing input/output processing. The function that is performing input/output processing, such as the function "read( )", is an example of a second function.

Referring to FIG. 5 again, the description will be continued.

The aggregation unit 21 is a processing unit that aggregates the number of times that the identification unit 20 has identified the function that is performing either input or output processing within a predetermined period of time. Hereinafter, the function performing either input or output processing is simply referred to as a function performing input/output processing. Further note that the predetermined period of time is an example of a first period of time. As an example, the aggregation unit 21 calculates the ratio of the number of times that the function has been identified within the predetermined period of time to the total number of times that the interrupt processing unit 17 has generated an interrupt within the predetermined period of time. The predetermined period of time is not particularly limited, and may be the period from the start of the execution of the program 1 to the end of the execution of the program 1, for example.

The output unit 22 outputs the instruction to display the aggregate result by the aggregation unit 21 to the display unit 12.

FIG. 8 schematically illustrates a display example of the display unit 12 in this case.

As illustrated in FIG. 8, the display unit 12 displays "cat", of which "STAT" is "D" in FIG. 6, and "read", which is the symbol of the function "read( )" corresponding to the process ID of "cat", in association with each other. Furthermore, the display unit 12 displays "34.93%" calculated by the aggregation unit 21 in the column "Overhead" in association with "cat". This example indicates that 34.93% of the predetermined period of time, which is from the start of the execution of the program 1 to the end of the execution of the program 1, is spent on the execution of the cat command.

As described above, in the present embodiment, the first determination unit 18 determines whether the function that puts the processor into a sleep state (e.g., a cpuidle_enter_state function) is being executed, and the identification unit 20 identifies the function that is performing input/output processing (for example, a read function) when the function that puts the processor into a sleep state is being executed. Accordingly, even when the processor is in a sleep state waiting for input and output, the function that caused the state of waiting for input and output (a read function) can be identified, and the developer can be provided with clues to improve the program 1.

Next, an aggregation method in accordance with the present embodiment will be described.

Figure 9:
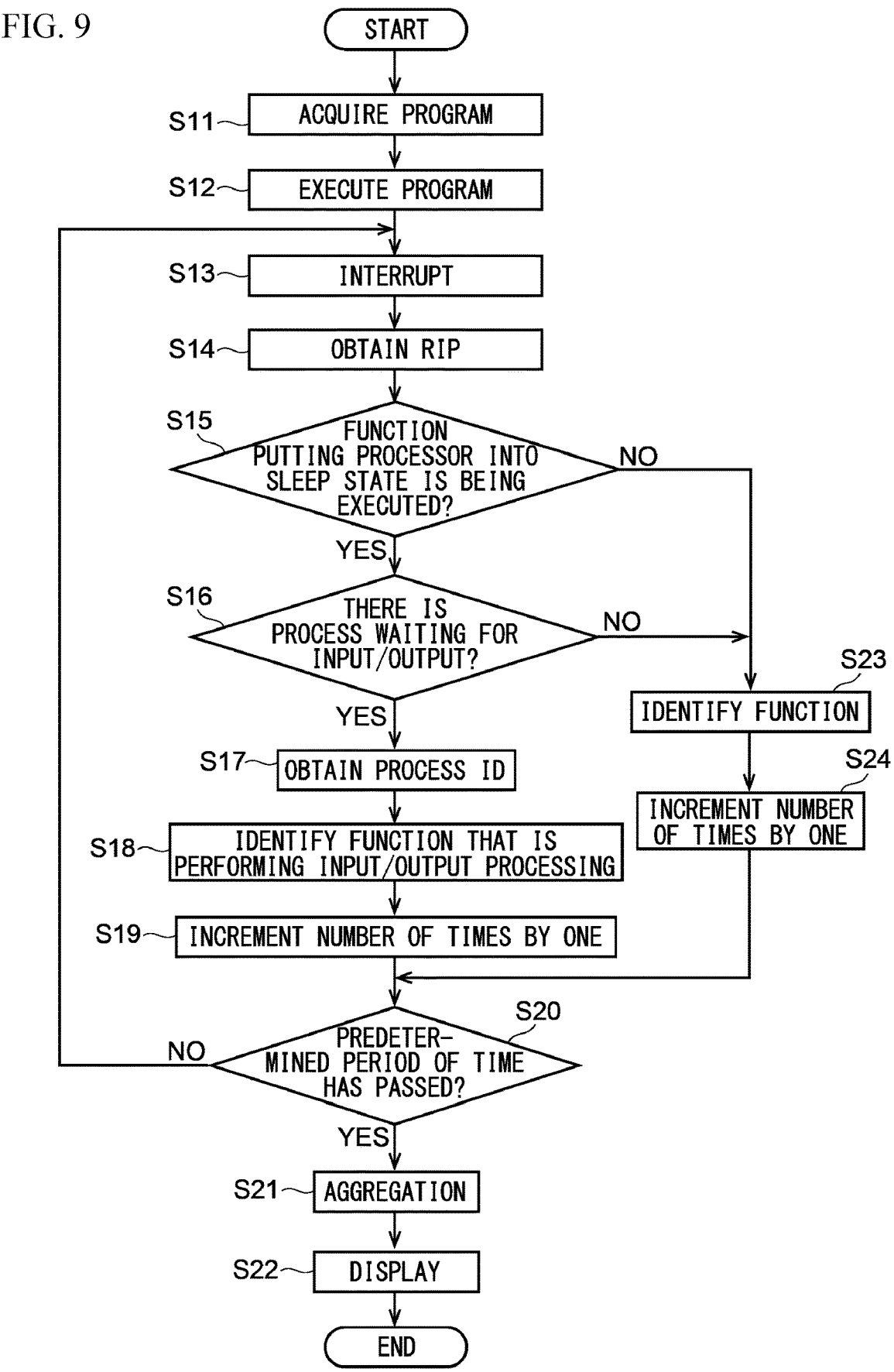
FIG. 9 is a flowchart of an aggregation method in accordance with the embodiment.

FIG. 9 is a flowchart of the aggregation method in accordance with the present embodiment.

First, the acquisition unit 15 acquires the program 1 through the communication unit 11, and stores the program 1 in the storage unit 14 (step S11).

Then, the execution unit 16 causes the processor to execute the program 1 stored in the storage unit 14 (step S12).

Then, the interrupt processing unit 17 interrupts the processor by executing perf (step S13).

Then, the first determination unit 18 obtains the RIP at the time when the interrupt was executed (step S14).

Then, the first determination unit 18 determines whether the processor is executing the function that puts the processor into a sleep state at the time when the interrupt was executed, based on the obtained RIP (step S15).

When it is determined that the processor is executing the function that puts the processor into a sleep state, the process proceeds to step S16, and the second determination unit 19 determines whether the processor is executing a process waiting for input and output.

When it is determined that the processor is executing the process waiting for input and output, the process proceeds to step S17, and the second determination unit 19 obtains the process ID of the process waiting for input and output.

Then, the identification unit 20 identifies the function that is performing input/output processing by executing the gstack command specifying the process ID obtained at step S17 as the argument (step S18). In the example of FIG. 7 described above, the function "read( )" is the function that is performing input/output processing.

Then, the aggregation unit 21 increments the number of times that the function that is executing input/output processing has been identified by one (step S19).

Then, the aggregation unit 21 determines whether a predetermined period of time has passed since the first execution of step S13 (step S20). In this example, the period from the start of the execution of the program 1 to the end of the execution of the program 1 is defined as the predetermined period of time as described above.

When it is determined that the predetermined period of time has passed, the process proceeds to step S21. In step S21, the aggregation unit 21 calculates the ratio of the number of times in step S19 to the number of times that an interrupt has been generated in step S13 within the predetermined period of time. When the function is the function "read( )" described above, the aggregation unit 21 calculates the ratio of the number of times that the function "read( )" has been identified to the number of times that an interrupt has been generated.

Then, the output unit 22 outputs an instruction to display the aggregate result obtained in step S21 to the display unit 12, and the display unit 12 displays the aggregate result (step S22). Accordingly, it is revealed that the execution time of the function "read( )" occupies a large percentage of the execution time of the program 1 when the program 1 is executed, and the developer can improve the program 1 based on this result.

When the predetermined period of time has not passed (step S20: NO), the process is executed from step S13 again.

In addition, when it is determined that the function that puts the processor into a sleep state is not being executed in step S15, the process proceeds to step S23. In step S23, the identification unit 20 identifies the function that is being executed at the time when the interruption was executed in step S13, based on the RIP obtained in step S14. The identified function is not the function that puts the processor into a sleep state, but the function that executes various processes using the processor. In the example of FIG. 8, the function "_random" and the function "_init" are such functions. These functions are examples of a third function.

When it is determined that there is no process waiting for input and output in step S16, step S23 is executed in the same manner.

Then, the aggregation unit 21 increments the number of times that the function has been identified in step S23 by one (step S24). In the example described above, the aggregation unit 21 increments the number of times that the function "_random" has been identified or the number of times that the function "_init" has been identified by one.

Thereafter, after step S20 is executed as described above, the process proceeds to step S21. In step S21, the aggregation unit 21 calculates the ratio of the number of times in step S24 to the number of times that an interrupt has been generated in step S13 within the predetermined period of time. Thereafter, in step S22, the display unit 12 displays the aggregate result. This allows the developer to know that "Overhead" of the function "_random" is 13.19% as illustrated in FIG. 8, and the "Overhead" of the function "_init" is 1.75%.

In the above manner, the basic steps of the aggregation method in accordance with the embodiment are completed.

In the present embodiment described above, it is determined whether the function that puts the processor into a sleep state is being executed in step S15, and when the function that puts the processor into a sleep state is being executed, the function that is performing input/output processing is identified in step S18. Thus, even when the processor is in a sleep state waiting for input and output, the function that caused the state of waiting for input and output can be counted in step S21, and the developer can identify the function that causes the delay of the program 1.

Furthermore, in this example, when the function that puts the processor into a sleep state is not being executed, the function that was being executed at the time when an interrupt was executed in step S13 is identified in step S23, and aggregates the identified function in step S21. Therefore, the present embodiment can aggregate not only the function that puts the processor into a sleep state but also the function that executes various processes using the processor, therefore, increasing the clues for the developer to analyze the program 1.

In addition, in the present embodiment, instead of measuring the processing time of each of all functions written in the program 1, the function that was being executed at the time when an interrupt was executed in step S13 is aggregated in step S21. Therefore, the processing overhead can be reduced compared with a case where the processing time of each of all functions written in the program 1 is measured.

Furthermore, the period from the start of the execution of the program 1 to the end of the execution of the program 1 is employed as the predetermined period of time in step S20. Thus, the program 1 can be analyzed thoroughly.

Hardware Configuration

Next, a description will be given of a hardware configuration of the aggregation device 10 in accordance with the present embodiment.

Figure 10:
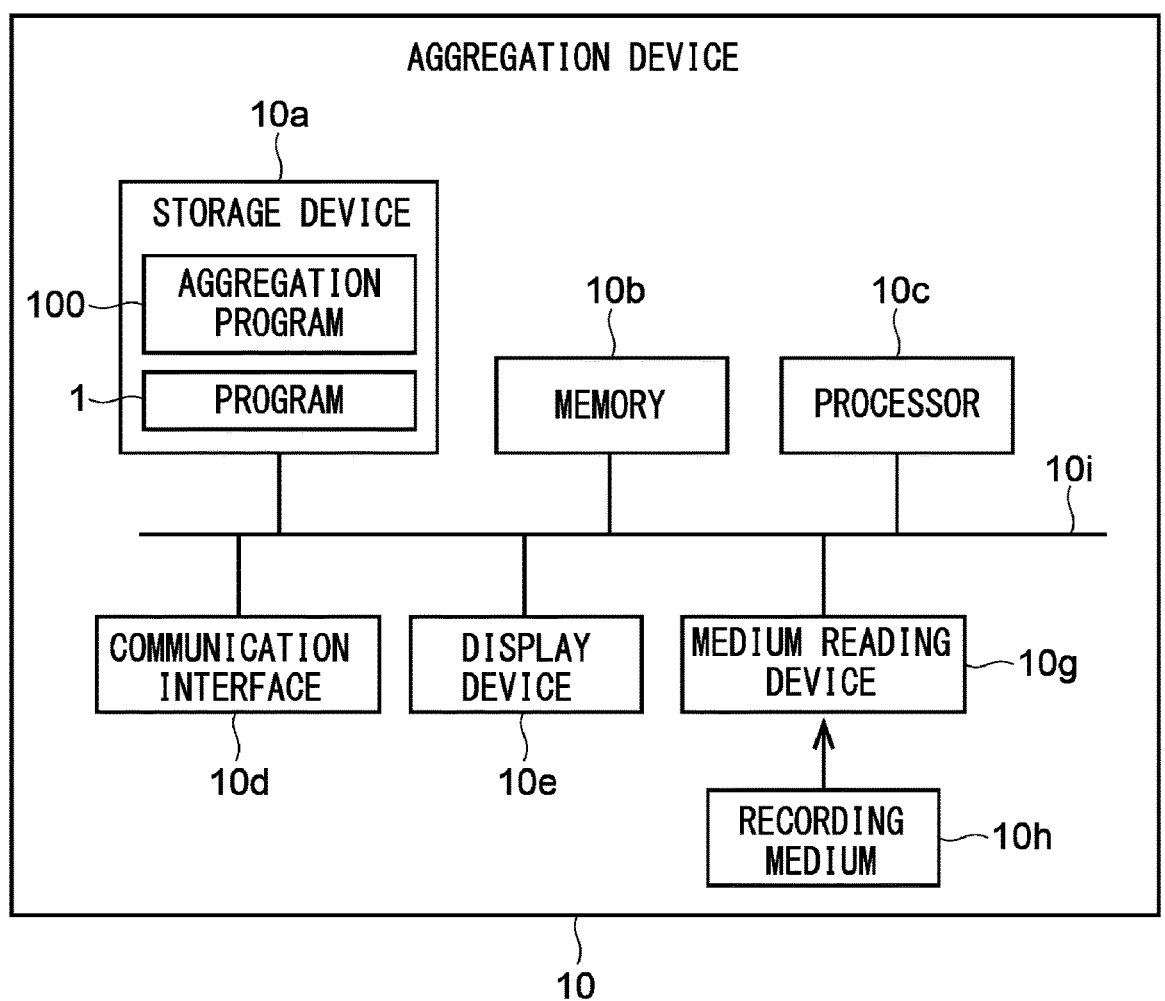
FIG. 10 is a hardware configuration diagram of the aggregation device in accordance with the embodiment.

FIG. 10 is a hardware configuration of the aggregation device 10 in accordance with the present embodiment. As illustrated in FIG. 10, the aggregation device 10 includes a storage device 10a, a memory 10b, a processor 10c, a communication interface 10d, a display device 10e, and a medium reading device 10g. These components are connected to each other through a bus 10i.

The storage device 10a is a non-volatile storage such as a hard disk drive (HDD) and a solid state drive (SSD), and stores an aggregation program 100 in accordance with the present embodiment and the program 1 to be examined.

The aggregation program 100 may be recorded in a computer-readable recording medium 10h, and the processor 10c may be caused to read the aggregation program 100 from the computer-readable recording medium 10h through the medium reading device 10g.

Such a recording medium 10h may be a physically portable recording medium such as a compact disc-read only memory (CD-ROM), a digital versatile disc (DVD), or a universal serial bus (USB) memory, for example. Also, a semiconductor memory such as a flash memory, or a hard disk drive may be used as the recording medium 10h. Such a recording medium 10h is not a temporary medium such as carrier waves not having a physical form.

Further, the aggregation program 100 may be stored in a device connected to a public line, the Internet, a LAN, or the like. In this case, the processor 10c reads and executes the aggregation program 100.

Meanwhile, the memory 10b is hardware that temporarily stores data like a dynamic random access memory (DRAM) or the like. The aggregation program 100 is loaded into the memory 10b.

The processor 10c is hardware such as a central processing unit (CPU) or a graphical processing unit (GPU) that controls the components of the aggregation device 10. The processor 10c and the memory 10b cooperatively execute the aggregation program 100.

As the memory 10b and the processor 10c cooperate to execute the aggregation program 100, the control unit 13 of the aggregation device 10 (see FIG. 5) is implemented. The control unit 13 includes the acquisition unit 15, the execution unit 16, the interrupt processing unit 17, the first determination unit 18, the second determination unit 19, the identification unit 20, the aggregation unit 21, and the output unit 22.

The storage unit 14 (see FIG. 5) is implemented by the storage device 10a and the memory 10b.

Further, the communication interface 10d is hardware such as a network interface card (NIC) for connecting the aggregation device 10 to a network such as a LAN and the Internet. The communication unit 11 (sec FIG. 5) is implemented by the communication interface 10d.

The display device 10c is hardware such as a liquid crystal display or a touch panel for displaying the aggregate result as illustrated in FIG. 8. The display unit 12 (see FIG. 5) is implemented by the display device 10e.

The medium reading device 10g is hardware such as a CD drive, a DVD drive, and a USB interface for reading the recording medium 10h.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various change, substitutions, and alterations could be made hereto without departing from the spirit and scope of the invention.

What is claimed is:

1. A non-transitory computer-readable recording medium storing an aggregation program causing a computer to execute a process, the process comprising:
   determining, plural times within a first period of time, whether a first function, which puts a processor into a sleep state, is being executed among functions written in a program being executed by the processor;
   identifying a second function that is performing either input or output processing among the functions when it is determined that the first function is being executed; and
   aggregating a number of times that the second function is identified within the first period of time, the determining of whether the first function is being executed is executed by generating an interrupt to the processor periodically, and the aggregating includes calculating a ratio of the number of times that the second function is identified within the first period of time to a number of times that the interrupt is generated within the first period of time, without measuring a processing time of the functions written in the program.

2. The non-transitory computer-readable recording medium according to claim 1, wherein the process further comprises determining whether a process waiting for either input or output is being executed when it is determined that the first function is being executed, and wherein the identifying of the second function is executed when it is determined that the process is being executed.

3. The non-transitory computer-readable recording medium according to claim 1, wherein the process further comprises:

identifying a third function that is being executed by the processor when it is determined that the first function is not being executed, and wherein the aggregating includes calculating a ratio of the number of times that the third function is identified within the first period of time to a number of times that the interrupt is generated within the first period of time, without measuring the processing time of the functions written in the program.

4. The non-transitory computer-readable recording medium according to claim 1, wherein the first period of time is a period from start of execution of the program to end of the execution of the program.

5. The non-transitory computer-readable recording medium according to claim 1, wherein the process further comprises displaying a result of the aggregating on a display.

6. An aggregation method implemented by a computer, the aggregation method comprising:

determining, plural times within a first period of time, whether a first function, which puts a processor into a sleep state, is being executed among functions written in a program being executed by the processor;

identifying a second function that is performing either input or output processing among the functions when it is determined that the first function is being executed; and aggregating a number of times that the second function is identified within the first period of time, the determining of whether the first function is being executed is executed by generating an interrupt to the processor periodically, and the aggregating includes calculating a ratio of the number of times that the second function is identified within the first period of time to a number of times that the interrupt is generated within the first period of time, without measuring a processing time of the functions written in the program.

7. The aggregation method according to claim 6, wherein the aggregation method further comprises displaying a result of the aggregating on a display.

* * * * *